March 6, 1928.
L. R. VAN SANT
1,661,450
FUEL BURNING SYSTEM
Filed June 12, 1925  2 Sheets-Sheet 1
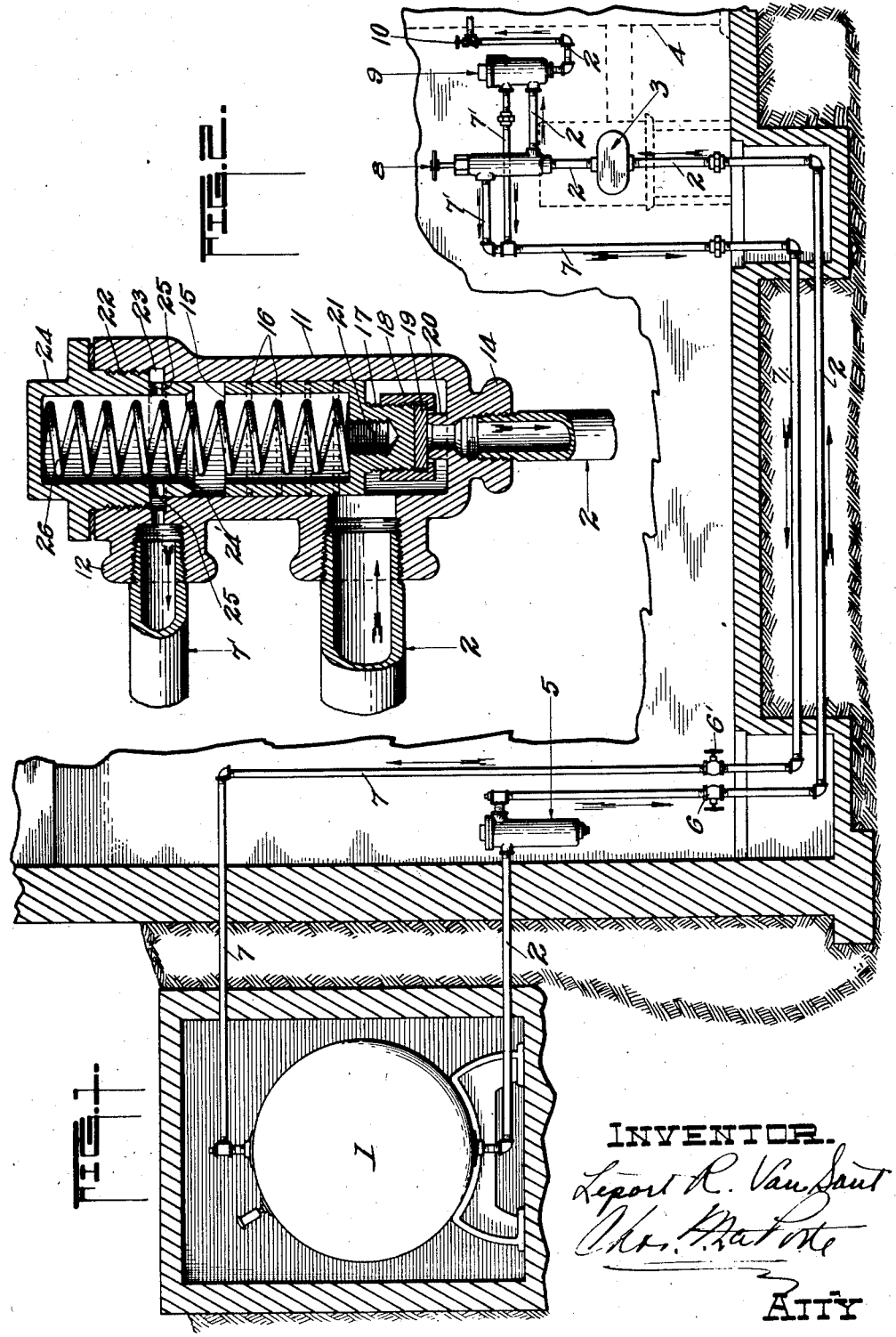
INVENTOR.
Leport R. Van Sant
ATTY

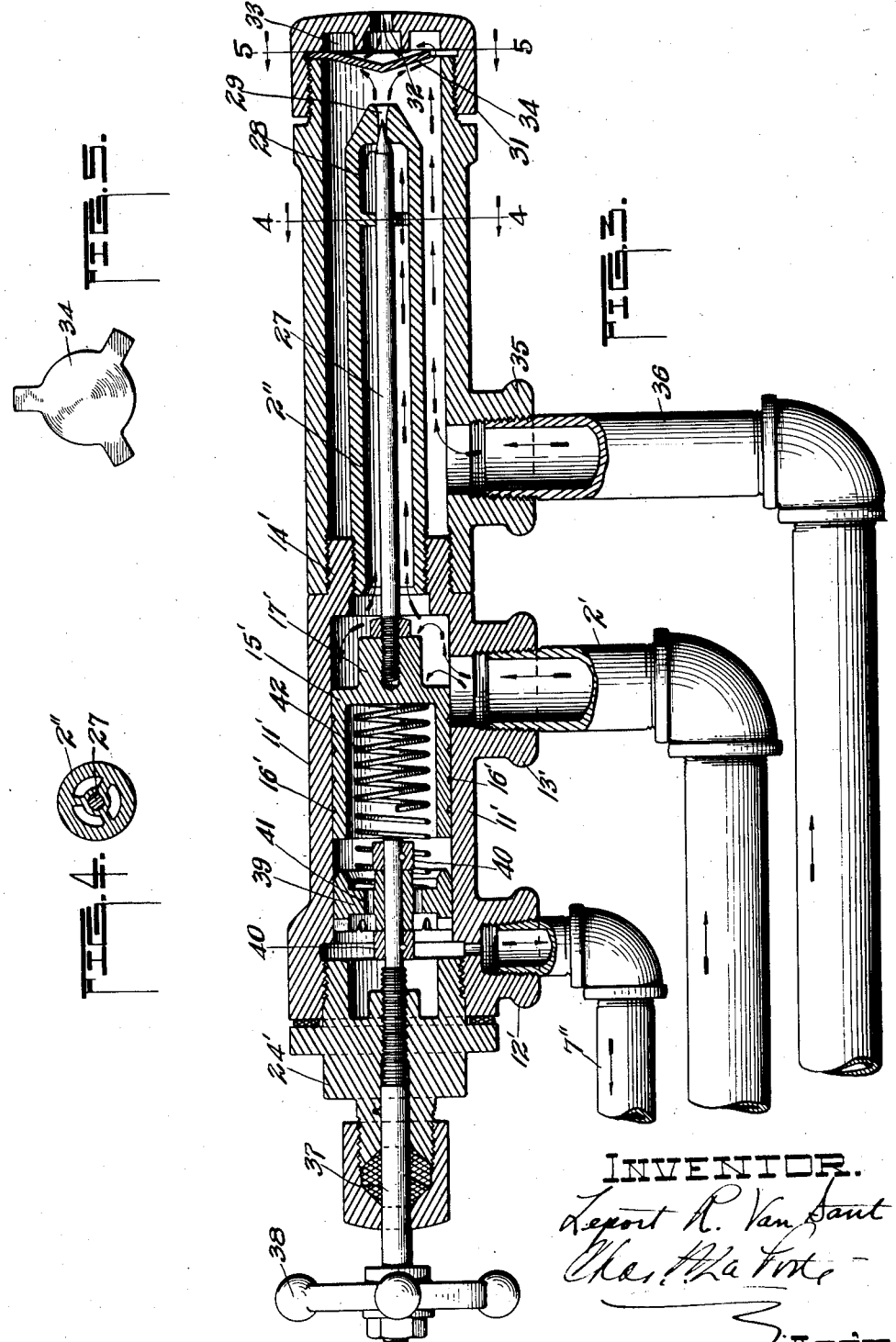
March 6, 1928.
L. R. VAN SANT
FUEL BURNING SYSTEM
Filed June 12, 1925
1,661,450
2 Sheets-Sheet 2

Patented Mar. 6, 1928.

1,661,450

UNITED STATES PATENT OFFICE.

LEPORT R. VAN SANT, OF PEORIA, ILLINOIS.

FUEL-BURNING SYSTEM.

Application filed June 12, 1925. Serial No. 36,611.

This invention has reference to an automatic pressure valve and has for its principal object to control or regulate the flow, preferably, of liquid fuel in fuel-burning systems.

The invention has for a further object to provide in a liquid fuel burning system, a valve arranged for communication with supply and return fuel lines and having valve means operable when the fuel in the supply line is supplied at a predetermined pressure, by suitable pressure means; whereby the valve is automatically opened to permit the passage of the liquid fuel there-through to the fuel burning means and which is capable of being automatically closed when the pressure of the liquid fuel in the supply line drops below such predetermined pressure. Such a valve controlling means, completely shutting off the flow or dripping of liquid fuel at or near the terminus of the system or at the fuel burning means, when the pressure means is shut off and during the final momentum thereof and before its complete stoppage; thereby preventing waste of the liquid fuel and possible carbonization, which would arise because of any such continued flow and the presence of the heat at the fuel burning means and which would result in an obstruction or deflection of the oil or oil vapor at or from the nozzle.

A further object of the invention is in the provision of such a valve controlling means located between the pressure means and the fuel burning means and also in communication with supply and return fuel lines; the arrangement being such, that, when the fuel is supplied at or above a predetermined pressure the valve is actuated by the pressure against the piston to permit the liquid fuel to be supplied to the fuel burning means; provision being made for liquid fuel seeping through the valve to find passage into the return fuel line, such provision also preventing any counter-action on the valve means to obviate overcoming such predetermined pressure; a relief valve being provided for excess fuel built up by the pressure means, which, under normal conditions, may not find immediate passage through such valve controlling means; such relief valve being in communication with the return fuel line for the passage of excess fuel thereinto.

The invention has for a still further object to provide in such a valve controlling means, located in the system between the pressure means and liquid fuel burning means, an atomizer so arranged as to receive a mixture of liquid fuel supplied through the supply line and steam or air through a line provided for that purpose. The valve structure and controlling means being not unlike that previously referred to, except in the provision of a needle valve and an adjusting means to regulate the volume of flow of liquid fuel through the atomizer, at or above such predetermined pressure.

That the invention may be more fully understood, reference is had to the accompanying drawings forming a part of the present description, illustrating a preferred embodiment of the invention, in which:—

Figure 1 is a more or less diagrammatic view, partly in cross-section, showing my automatic pressure and relief valves included in a fuel burning system;

Figure 2 is a vertical cross-sectional view, showing my improved pressure valve;

Figure 3 is a cross-sectional view of my improved pressure valve shown applied to an atomizer structure and embodying regulating means;

Figure 4 is a cross-section, as the same would appear if taken on the line 4—4, Figure 3, and Figure 5 is an end view of the deflector plate, as the same would appear if taken on the line 5—5, Figure 3.

Like characters of reference denote corresponding parts throughout the figures.

Liquid fuel burning systems now in general use and employed preferably as heating agencies for homes, dwellings and industrial purposes, and especially those systems including pressure means for supplying the liquid fuel to the fuel burning means, have caused considerable inconvenience and at times damage due to their lacking a means for properly supplying and shutting off the supply of liquid fuel to the fuel burning means, to which this invention has particular reference. For example—users of liquid fuel burning systems including fuel pressure means for supplying the liquid fuel to the fuel burning means have experienced occasions whereupon the pressure means being discontinued, the liquid fuel continued to flow from the fuel burning means until the pressure died out, resulting in the dripping of liquid fuel from the fuel burning means within the heater or furnace, and due to the extreme heat of the walls of the heater or furnace cause such dripping fuel to be ignited or partially ignited and carbonize upon the fuel burning means at or near the point of fuel discharge. The disadvantage of such carbonization may be readily seen as it would later prevent the liquid or vapor fuel from igniting, or even being properly ejected from the nozzle, due to the same being partially stopped up due to carbonization of the liquid fuel at such point of discharge. This causes the possible flooding of the heater or furnace with liquid fuel and general inconvenience and possible fire hazard. It will be further understood that fuel systems of the type referred to, have a further disadvantage, in that, there has been no provision of means whereby, upon the operation of the fuel pressure means the supply of fuel upon being ejected from the fuel burning means is immediately atomized and upon the cessation of the pressure means the liquid fuel ejected from the fuel burning means is discontinued in a state of atomization, instead of being first introduced into the heater or furnace before being properly atomized or allowed to drip from the fuel burning means until stopped, as has been the custom in the past.

Referring to the drawings, Figure 1 discloses the usual well known fuel reservoir or container 1 located preferably underneath the ground and having connected, preferably to its bottom wall a supply line 2, and including in said line a suction and pressure pump 3, of any well known make or construction, preferably located at or near the furnace or heater 4, shown in dotted lines. A strainer 5 of any well known type is preferably included in the supply line, for removing any foreign particles present in the liquid fuel. A globe valve 6 is further provided in the supply line in order that the pipe or line 2 may be exempt from fuel, if desired, for repairs, etc.

A return fuel line 7 is provided, having connection preferably with the top wall of the reservoir 1, and to the return port or opening of a relief valve 8 of any well known make, having connected at its lower end the supply line 2, preferably within the locality of the pressure means 3, as shown.

Connected to the relief valve 8, by means of the supply line 2 is provided an automatic means or pressure valve 9, depending from which the supply line 2 leads to the fuel burning means, not shown, within the furnace or heater 4. A suitable regulating valve 10 is provided, as shown, for the purpose of regulating the volume of flow to the fuel burning means, not shown, within the furnace or heater 4.

Connected to the upper portion of the pressure valve 9, is an auxiliary return fuel line 7', coupled to the return fuel line or pipe 7, preferably in the manner and arrangement shown in Fig. 1. A globe valve 6' is also included in the return fuel line 7, located for convenience near the corresponding valve 6, in the supply line 2 and for similar purposes.

The automatic pressure valve 9 is best seen in detail in Figure 2 and is shown comprising a casting or shell 11 having nipples 12, 13 and 14 for connection of the auxiliary return fuel line or pipe line 7' the supply line or pipe 2, and fuel line to the regulating valve 10 respectively, as shown. A sleeve-like piston 15 having an open upper end and closed at its lower end is provided to have a slidable relation with the inner walls of said casting or shell 11. Provided on the outer surface of the piston 15 are a plurality of annular grooves 16 for the purpose of allowing foreign particles or dirt to lodge therein and prevent the piston from becoming stuck, such dirt being cleaned from the grooves manually or gradually finding its way to the auxiliary return fuel line or pipe 7', as will be understood by the following description. Provided on the lower end of the piston 15 is a reduced depending member 17 threaded for screwing thereon a locking member 18, which encloses a preferably fibre disk 19 for overlying and resting upon the upstanding part or opening 20 leading into the supply line or pipe 2 connected therebelow. A small threaded depression 21 is provided in the lower inner portion of the piston 15 for screwing therein a bolt or other suitable removing means for removing the piston for cleaning or repairs.

Referring to the upper end of the casting or shell 11, a portion thereof is cut away, as at 22, to increase its inner diameter over the remainder or major portion thereof and threaded interiorly to receive the hollow threaded cap or closure 24 for closing the upper end of said casting 11. Said cap has a reduced shouldered lower end formed or provided with a plurality of openings 25 communicating with an annular groove 23 formed by the shouldered construction of the upper end of the shell 11 and the cap 24 to allow liquid fuel, which has seeped between the wall of the casting or shell 11 and the wall of the piston 15, to be returned to the fuel reservoir 1 by means of the auxiliary fuel line 7' and the return fuel line 7, as will be readily understood. The openings 25 and annular groove 23 being normally in the same plane with the opening through the nipple 12 and the shoulder formed by the reduced end 17 is normally disposed to allow ingress of the fuel from the supply line 2 into the shell or casting 11. A coil spring 26 is adapted to be inserted within the piston 15 and cap 24 and upon screwing in place the cap 24 the spring is held in place in contracted position, the piston 15 being forced downwardly with the disk 19 closing the opening 20. It will be understood that the coil spring may have different resistances due to its heavy or light construction, as may be desired. In other words, if it is desired, for the valve to operate or to release liquid fuel when the same has reached a pressure of fifty (50) pounds or over, it will be necessary to provide a coil spring having a resistance of fifty (50) pounds pressure. To operate the valve at less or smaller pressures, it will be apparent that small sized springs must be employed.

Assuming the pressure valve 9 to have a coil spring 26 having a maximum resistance of fifty (50) pounds and the relief valve 8, preferably set for a maximum resistance of one hundred (100) pounds, the operation of the system, assuming the fuel reservoir or container 1 containing fuel, would be as follows:—

Upon the starting of the pressure means or pump 3 by manual means or thermostatic control, the same would commence to suck liquid fuel from the reservoir or container 1 into the supply line or pipe 2, passing through the strainer 5, and upon reaching the pump would be forced under pressure through the line 2 to the relief valve 8, when it would be directed from the same through the line 2 into the pressure valve 9 and directed against the piston 15 thereof. Due to the fact that the pressure means 3, upon starting, is unable to immediately direct a pressure equal to the maximum resistance of the coil spring 26 of the valve 9, it will be readily understood that no fuel is furnished to the fuel burning means or is returned to the reservoir 1 by way of the relief valve 8 having a greater resistance, however, with the continuation of the pressure means 3, a pressure equal to the maximum resistance of the coil spring of the valve 9 is quickly obtained and upon that being reached, forced the piston 15 upwardly from the seat 20, allowing the discharge of liquid fuel from the valve 9, at a pressure either equal to or above the maximum resistance to the coil spring, with the result that liquid fuel is furnished to the fuel burning means, within the heater or furnace, at a pressure for proper and immediate atomization.

It will be further understood, that the full capacity of the pressure means 3 is not furnished or used by the fuel burning means, due to the limitation thereupon by means of the regulating valve 10, previously referred to. It will be further understood that due to the limiting of such supply of fuel to the burner, by means of the valve 10, that the pressure means 3 builds up an increasing pressure upon the liquid fuel and upon the pressure reaching one hundred (100) pounds, the relief valve is opened by reason of such pressure and the fuel is returned to the reservoir or container 1 through the return fuel line 7, as unused or excess fuel, to be pumped over again.

Upon the cessation of the pressure means, it is to be understood that the pressure upon the liquid fuel is stopped, and upon the pressure falling to the maximum resistance of the coil spring 26 of the valve 9, the piston 15 is forced down against the seat 20, thereby shutting off the further entrance of liquid fuel to the fuel burning means; the fuel being shut off at or about the same pressure at which it was furnished to the fuel burning means and as a result thereof, preventing dripping of excess fuel into the heater or burner, to be possibly ignited by the heat of the fire walls and carbonizing upon the fuel burning means, the inconvenience and possible danger previously explained, is obviated.

To provide for possible leakage from the supply line 2 to the return line 7 through the shell or casting 11, when the valve 15 is seated and of the casting 11 and the wall of the piston 15, the liquid fuel finds its way around the valve 15 and into and through the annular groove 23 and out through the openings 25 in the cap 24 into the auxiliary return fuel line 7' which has connection with the return fuel line 7 through which the fuel is returned, under pressure, to the reservoir or container 1. When the valve 15 is raised, by the pressure of the fuel thereagainst, entering the shell 11 from the supply line 2, the upper end of said valve seats itself against a seat 24' on the lower end of the cap 24, stopping leakage of the fuel through the shell 11 to the return line 7'.

The application of an automatic pressure valve, such as has just been described, to an automizing structure without departing from the principle of the invention is shown in detail in Figure 3, except for the inclusion of a needle valve and an adjusting means to regulate the volume of flow of liquid fuel to the atomizer, at or above the predetermined pressure. The valve is substantially alike in all particulars to the valve structure shown in Figure 2, and includes a casting or shell 11' having nipples 12', 13' and 14' for securement or attachment thereto of the return fuel line 7'', supply line 2' and an elongated tubular stem 2'', respectively, the stem 2'' having a threaded engagement with the nipple 14', as shown in Figure 3. A sleeve-like piston 15', substantially alike to the piston in Figure 2, is provided to have a slidable relation with the inner walls of the casting shell 11' and has provided in the outer wall thereof a plurality of annular grooves 16', for purposes previously explained in Figure 2. An extension member 17' of the piston 15' is so constructed to have connected thereto a needle valve 27 operative and guided within the elongated tubular stem 2″ and to have its needle point 28 thereof arranged to close the valve seat or port 29 in the stem 2″.

Detachably connected to extend forwardly and axially of the shell 11′ is a tubular casing or elongated sleeve 30 surrounding and extending forward of the stem 2″, as shown, and threaded exteriorly at its forward end to receive a cap or nozzle 31 having a discharge orifice 32 and being chambered on the inside as at 33. The cap or nozzle 31 holds in position a baffle plate or deflector 34 preferably of the construction shown in Figure 5. Such baffle plate or deflector is positioned slightly forward of the port 29 through the end of the stem 2″. The casing or elongated sleeve 30 has a nipple 35 at or near its inner end to which is connected an air or steam line 36. The construction as described, will permit liquid fuel entering the shell 11′ from the supply line to 2′ to act against the end of the piston 15′ and pass through the tubular stem 2″ around the needle valve 27 and when the latter is in open position to pass out of the stem 2″ through the port 29 and thence around the baffle plate or deflector 34 and out through the orifice 32 arranged in the cap or nozzle 31. At the same time air or steam entering the casing or elongated sleeve 30 through the pipe 36 will be directed forwardly around the stem 2″ and be caused to intermingle with the liquid fuel at the baffle plate or deflector 34 and properly atomize the same to be ejected through the orifice 32. The needle valve 27 is guided in the stem 2″ in the manner shown in Figures 3 and 4, preferably the latter figure.

The cap or closure 24′ is not unlike the cap or closure 24, except that it has threaded thereto the operating stem 37 with a finger hold or adjusting wheel 38. And said cap or closure 24′ is minus the openings 23 therein and stopped short of the opening through the nipple 12′ and interposed in the shell 11′ between the valve member 15′ and the cap or closure 24′, is a sleeve-like member or collar 39 loose on the stem 37 and capable of being moved by said stem axially of the shell 11′ but without rotation. Said sleeve-like member or collar 39 is held in position on the stem 37 by the collar members 40, on either side thereof, which are suitably secured to the stem 37. The sleeve-like member or collar 39 functions somewhat as the inner end of the cap or closure 24 in its relation to the valve 16′, except that it may be manually adjusted toward and from the valve 15′ to control the movement of the valve 15′ under the pressure of the fluid entering the shell 11′ from the supply line 2′ and thereby regulate the movement of the valve stem 27 and also regulate and control the size opening through which the fuel may find egress through the valve seat or port 29 in the end of the stem 2″. In other words, the adjustment of the stem 37, will result, as will be understood in controlling the volume of fuel passing through the port 29 in the end of the stem 2″. The sleeve-like member or collar 39 is formed or provided with a plurality of axially arranged openings or ports 41 for the seepage of fuel passing around the valve 16′ to find egress from the shell 11′ to the opening of the nipple 12′ and thence into the pipe 7″. A coil spring 42 which functions, as does the spring 26, is carried within the valve 15′ and bears thereagainst and against the sleeve-like member or collar 39.

The operation of the structure shown in Figure 3 is substantially the same as the structure shown in Figures 1 and 2, with the exception that the structure shown in Figure 3 includes an atomizer and the volume of liquid fuel discharged through the atomizer may be manually controlled, all of which, is believed will be understood without further explanatory description of the operation.

What I claim is:—

1. In a fuel feeding and regulating system for burners, a regulating valve including a casing having an inlet, outlet and a seepage port, a piston movable in said casing having a valve head at one end thereof adapted to engage and close the outlet port and provided at its opposite end with a depression, a compression spring engaged in said depression, and a valve seat carried by the casing and engaged by the opposite end of said piston to prevent seepage of the fuel around the piston when the same is raised and the outlet port is open.

2. A fuel burner and automatic regulator therefor, comprising a casing having a fuel inlet, a steam inlet and a fuel seepage port, a tube mounted intermediate the ends of the casing spaced from the walls thereof, said tube having a restricted orifice at its forward end and an enlarged opening at its opposite end, a spring pressed reciprocable valve in one end of the casing adapted to engage the enlarged opening in the tube, and having a continuation extending through and engaging the restricted orifice at the forward end of the tube, and means carried by the casing to prevent seepage around the piston when the same is opened to permit fuel to enter the burner.

3. In a feul feeding and regulating system for burners, a regulating valve including a casing having an inlet, outlet and a seepage port, a spring pressed piston movable in said casing having a valve head at one end thereof adapted to engage and close the outlet port, and means carried by the casing and engageable by the opposite end of the piston to prevent seepage around the piston when the same is raised and the outlet port is open.

4. In a fuel feeding and regulating system for burners, a regulating valve including a casing having an inlet, outlet and a seepage port, and a pressure operated piston movable in said casing having a valve head at each end, one end which is adapted to open and close the outlet port and the opposite end being formed to close the seepage port when the outlet port is wide open.

5. In a fuel feeding and regulating system for burners, a regulating valve including a casing having an inlet, outlet and a seepage port, and a piston movable in said casing having a valve head at each end, one end of which is adapted to open and close the outlet port and the other end being formed to permit seepage to escape until the outlet port is wide open and then to close the seepage port against all further escape of fluid.

6. A fuel feeding and regulating valve, including a casing having an inlet, an outlet and a seepage port, and a pressure operated piston movable in said casing having a valve head at each end thereof one end of which is adapted to open and close the outlet port and the other end being formed to permit seepage by the piston until the outlet port is wide open and then to retard all further passage of fluid through said seepage port.

7. In a fuel feeding and regulating system for burners, a regulating valve including a casing having an inlet, an outlet and a seepage port, a piston movable in said casing having a valve connected at one end thereof adapted to engage and close the outlet port, a valve seat formed in said casing and engageable by the opposite end of said piston to prevent seepage of the fuel around the piston when the same is moved towards said opposite end and the outlet port is open, a compression spring disposed between said valve seat and the last named end of the piston to normally hold the same away from said valve seat, and means to vary the tension of said compression spring.

In witness whereof, I have hereunto affixed my hand this 3rd day of June, 1925.

LEPORT R. VAN SANT.